United States Patent
Schnabl et al.

(10) Patent No.: US 9,697,534 B2
(45) Date of Patent: Jul. 4, 2017

(54) ATTRIBUTION MARKETING RECOMMENDATIONS

(71) Applicant: Google Inc., Mountain View, CA (US)

(72) Inventors: Stefan F. Schnabl, San Francisco, CA (US); Jon Vaver, Lafayette, CO (US); Arjun Satyapal, Sunnyvale, CA (US); John Huang, Sunnyvale, CA (US); Wenjie Jiang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 399 days.

(21) Appl. No.: 13/922,198

(22) Filed: Jun. 19, 2013

(65) Prior Publication Data

US 2014/0379490 A1    Dec. 25, 2014

(51) Int. Cl.
*G06F 17/00* (2006.01)
*G06Q 30/02* (2012.01)

(52) U.S. Cl.
CPC ..... *G06Q 30/0244* (2013.01); *G06Q 30/0256* (2013.01)

(58) Field of Classification Search
CPC .... G06Q 30/0275; G06Q 30/02; G06Q 30/08; G06Q 30/0247; G06Q 30/0277; G06Q 30/0243; G06Q 30/0251; G06Q 30/0283; G06Q 30/0245; G06Q 30/0202; G06Q 30/0206; G06Q 30/0246; G06Q 30/0255
USPC ..................................... 705/14.71, 200, 7.29
See application file for complete search history.

(56) References Cited

U.S. PATENT DOCUMENTS

| | | |
|---|---|---|
| 2005/0021397 A1 | 1/2005 | Cui et al. |
| 2006/0184421 A1* | 8/2006 | Lipsky .................. G06Q 30/02 705/14.42 |
| 2008/0114639 A1 | 5/2008 | Meek et al. |
| 2009/0106081 A1 | 4/2009 | Burgess et al. |
| 2010/0161422 A1* | 6/2010 | Zeevi et al. ............... 705/14.65 |
| 2011/0035272 A1* | 2/2011 | Bhatt ..................... G06Q 30/02 705/14.42 |
| 2012/0303447 A1* | 11/2012 | Hughes et al. ........... 705/14.46 |

OTHER PUBLICATIONS

Montgomery et al., "Predicting Online Purchase Conversion Using Web Path Analysis", Nov. 2002.
Rutz et al., "A Model of Individual Keyword Performance in Paid Search Advertising", Jun. 2007.

* cited by examiner

*Primary Examiner* — Scott Baderman
*Assistant Examiner* — Jason Edwards
(74) *Attorney, Agent, or Firm* — Fish & Richardson P.C.

(57) ABSTRACT

The present disclosure includes systems and techniques relating to identifying value marketing activities. In some implementations, an apparatus, systems, or methods can include receiving conversion path information including data relating to user interactions with a content item associated with a marketing activity, determining a first attribution credit by applying a first attribution model to the received information, and a second attribution credit by applying a second attribution model to the received information, determining an attribution contrast ratio based on the first and second attribution credit, identifying an opportunity based on the determined attribution contrast ratio, and presenting a recommendation for the marketing activity based on the identified opportunity.

22 Claims, 7 Drawing Sheets

ATTRIBUTION MARKETING RECOMMENDATIONS

BACKGROUND

This disclosure relates to systems and techniques for making marketing recommendations based, for example, on existing performance metrics of search marketing channels.

The Internet provides access to a wide variety of content. For instance, images, audio, video, and web pages for a myriad of different topics are accessible through the Internet. Content items (e.g., advertisements) can be placed within, or relative to, other content, such as a web page, image or video, or the other content can trigger the display of one or more content items, such as presenting a content item in a content item slot.

Content item providers (e.g., advertisers) decide which content items are displayed relative to other content using various content item management tools. These tools also allow a content item provider to measure the performance of various content items or ad campaigns. The parameters used to determine when to display a content item also can be changed using content item management tools.

The data that is used to generate performance measures for the content item provider generally includes all data that is available and relevant. This data usually includes a combination of data from multiple servers. The amount of the combined data typically is large enough that performance measures generated from the data can be used to provide an efficient way of understanding the data.

SUMMARY

This disclosure describes, among other things, systems and techniques for identifying value marketing activities based, for example, on existing performance metrics of search marketing channels. According to an aspect of the described systems and techniques, a method includes receiving information corresponding to a plurality of conversion paths, the information including data relating to user interactions with a content item, where the content item is associated with a marketing activity; determining a first attribution credit by applying a first attribution model to the received information, and a second attribution credit by applying a second attribution model to the received information; determining an attribution contrast ratio based on the first and second attribution credit; identifying an opportunity based on the determined attribution contrast ratio, where identifying the opportunity includes identifying marketing activities that may be undervalued, and where an undervalued marketing activity has an attribution contrast ratio greater than 1; and presenting a recommendation for the marketing activity based on the identified opportunity, wherein the recommendation includes a bid value for the marketing activity.

In some implementations, the attribution contrast ratio can be determined by dividing the second attribution credit by the first attribution credit. In some implementations, the attribution contrast ratio can be determined by the difference between the second attribution credit and the first attribution credit. In some implementations, the first attribution credit can correspond to a number of last user interactions with the content item across the plurality of conversion paths over a total number of the plurality of conversion paths and the second attribution credit corresponds to a number of first user interactions with the content item across the plurality of conversion paths over the total number of the plurality of conversion paths.

In some implementations, the first attribution model can be an attribution model currently used by a content item provider and the second attribution model can be an alternative attribution model. In some implementations, the marketing activity can correspond to one or more keywords. In some implementations, the content item can be an advertisement. In some implementations, the opportunity can be an opportunity to adjust spending for the marketing activity. Adjusting spending for the marketing activity can include placing or modifying bids on keywords.

Another aspect of the subject matter described in this specification can be implemented on one or more computer systems including one or more storage devices storing instructions that are operable, when executed by the one or more computer systems, to cause the one or more computer systems to perform operations including receiving information corresponding to a plurality of conversion paths, the information including data relating to user interactions with a content item, where the content item is associated with a marketing activity; determining a first attribution credit by applying a first attribution model to the received information, and a second attribution credit by applying a second attribution model to the received information; determining an attribution contrast ratio based on the first and second attribution credit; identifying an opportunity based on the determined attribution contrast ratio, where identifying the opportunity includes identifying marketing activities that may be undervalued, and where an undervalued marketing activity has an attribution contrast ratio greater than 1; and presenting a recommendation for the marketing activity based on the identified opportunity, wherein the recommendation includes a bid value for the marketing activity.

In some implementations, the operations can determine the attribution contrast ratio by dividing the second attribution credit by the first attribution credit. In some implementations, the first attribution credit can correspond to a number of last user interactions with the content item across the plurality of conversion paths over a total number of the plurality of conversion paths and the second attribution credit can correspond to a number of first user interactions with the content item across the plurality of conversion paths over the total number of the plurality of conversion paths.

In some implementations, the first attribution model can be an attribution model currently used by a content item provider and the second attribution model can be an alternative attribution model. In some implementations, the marketing activity can correspond to one or more keywords. In some implementations, the opportunity can be an opportunity to adjust spending for the marketing activity. Adjusting spending for the marketing activity can include placing or modifying bids on keywords.

Another aspect of the subject matter described in this specification can be implemented on a computer-readable medium having instructions stored thereon, where the instructions are operable to cause one or more computing devices to perform operations including receiving information corresponding to a plurality of conversion paths, the information including data relating to user interactions with a content item, where the content item is associated with a marketing activity; determining a first attribution credit by applying a first attribution model to the received information, and a second attribution credit by applying a second attribution model to the received information; determining an attribution contrast ratio based on the first and second attribution credit; identifying an opportunity based on the determined attribution contrast ratio, where identifying the opportunity includes identifying marketing activities that may be undervalued, and where an undervalued marketing activity has an attribution contrast ratio greater than 1; and presenting a recommendation for the marketing activity based on the identified opportunity, wherein the recommendation includes a bid value for the marketing activity.

In some implementations, the operations, can determine the attribution contrast ratio by dividing the second attribution credit by the first attribution credit. In some implementations, the first attribution credit can correspond to a number of last user interactions with the content item across the plurality of conversion paths over a total number of the plurality of conversion paths and the second attribution credit can correspond to a number of first user interactions with the content item across the plurality of conversion paths over the total number of the plurality of conversion paths. In some implementations, the first attribution model can be an attribution model currently used by a content item provider and the second attribution model can be an alternative attribution model.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1A:
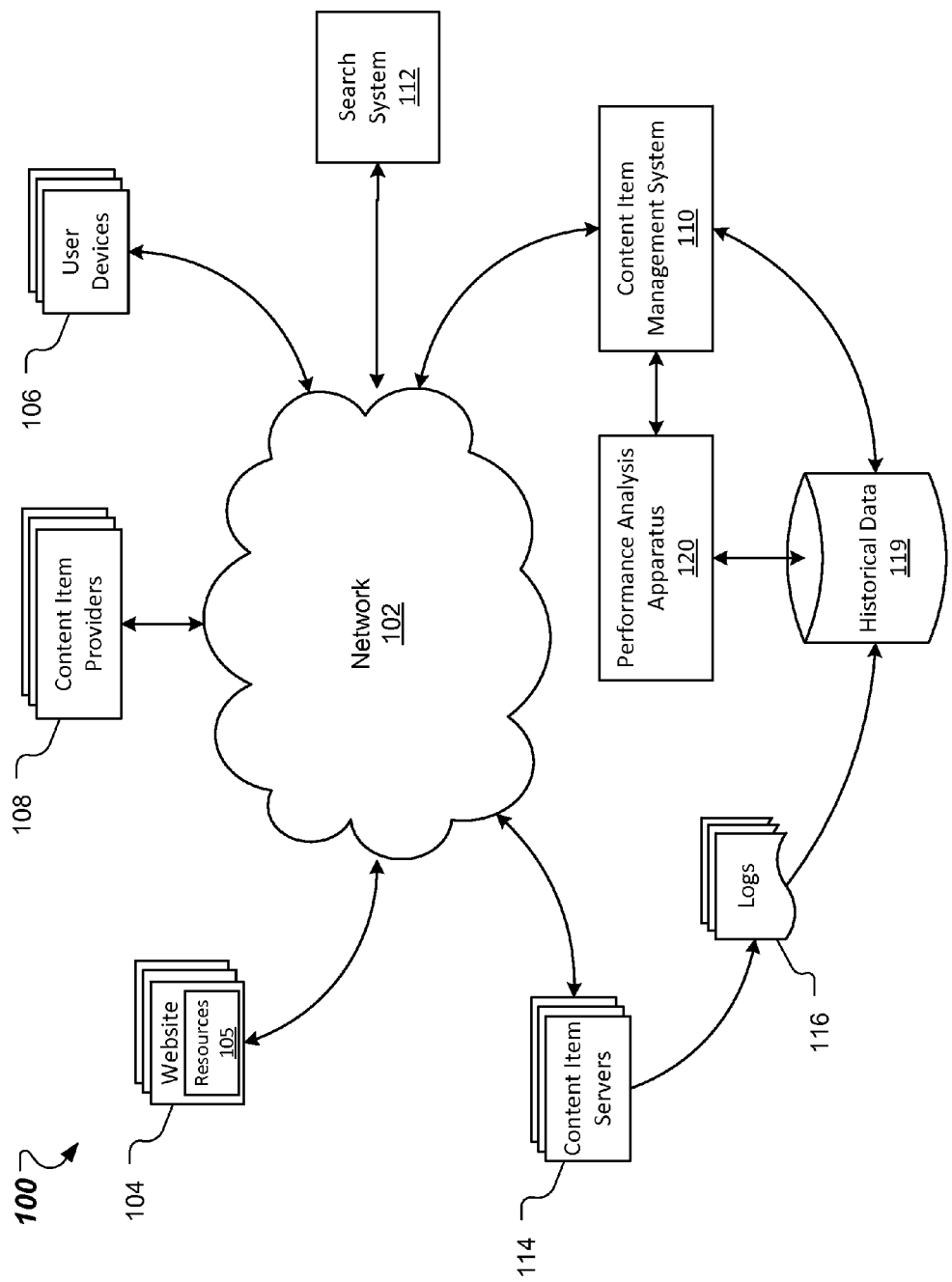
FIG. 1A is a block diagram of an example environment in which a content item management system manages marketing services.

Techniques are disclosed for identifying high value marketing activities based, for example, on existing performance metrics of search marketing channels. Marketing attribution is the practice of determining the role that marketing channels play in informing and influencing the user's path to conversion. Marketing attribution can provide visibility how marketing affects the entire sales cycle.

Particular implementations of the subject matter described in this specification can be implemented to realize none, one or more of the following potential advantages. Among others, marketing opportunities along a conversion path can be identified based on historical data and metrics and content item providers can focus on multiple positions with a strong performance prior to conversion. For example, undervalued and/or overvalued marketing activities can be presented to the content item provider. With this information, content item providers can better understand user behavior that leads up to a conversion and marketing opportunities along the conversion path.

Generally, users are likely to have more than one interaction with a marketing channel (e.g., paid search marketing, online display advertising, social media marketing, mobile, email, television, radio, postal mail, print magazines, and newspapers) before a purchase decision is made. Accordingly, more than one, or a series of, marketing channel interactions drive sales and conversions for a given content item provider. For example, a user can be exposed to tens, potentially hundreds, of interactions with marketing material before the user carries out a relevant action or conversion.

Various reports that disclose various user interactions with content can be provided to content item providers (e.g., advertisers). Each user interaction can include a number of dimensions, which can include data associated with the user interaction. A content item provider can select one or more user interactions to signify a conversion. Reports can be generated that illustrate the various user interactions that lead up to conversions. These reports can be used by a content item provider to analyze the performance of a content item or campaign.

As used throughout this document, user interactions include presentation of content to a user and subsequent affirmative actions or non-actions (collectively referred to as "actions" unless otherwise specified) that a user takes in response to presentation of content to the user (e.g., selections of the content following presentation of the content, or no selections of the content following the presentation of the content). Thus, a user interaction does not necessarily require a selection of the content (or other affirmative action) by the user.

User interaction measures can include one or more of time lag measures (i.e., measures of time from one or more specified user interactions to a conversion), path length measures (i.e., quantities of user interactions that occurred prior to conversions), user interaction paths (i.e., sequences of user interactions that occurred prior to the conversion), assist interaction measures (i.e., quantities of user interactions that occurred prior to the conversion), and assisted conversion measures (i.e., quantities of conversions that were assisted by specified content).

FIG. 1A is a block diagram of an example environment in which a content item management system manages marketing services in accordance with an illustrative embodiment. The example environment 100 includes a network 102, such as a local area network (LAN), a wide area network (WAN), the Internet, or a combination thereof. The network 102 can connect web sites 104, user devices 106, content item providers 108, and a content item management system 110. The example environment 100 can include many thousands of web sites 104, user devices 106, and content item providers 108.

A website 104 can include one or more resources 105 associated with a domain name and hosted by one or more servers. An example website is a collection of web pages formatted in hypertext markup language (HTML) that can contain text, images, multimedia content, and programming elements, such as scripts.

A resource 105 can be any data provided over the network 102. A resource 105 can be identified by a resource address that is associated with the resource 105, such as a uniform resource locator (URL). Resources 105 can include web pages, word processing documents, portable document format (PDF) documents, images, video, programming elements, interactive content, and feed sources, to name only a few. The resources 105 can include content, such as words, phrases, images and sounds, that may include embedded information (such as meta-information in hyperlinks) and/or embedded instructions. Embedded instructions can include code that is executed at a user's device, such as in a web browser. Code can be written in languages such as JavaScript® or ECMAScript®.

A user device 106 is an electronic device that is under control of a user and is capable of requesting and receiving resources 105 over the network 102. Example user devices 106 include personal computers, mobile communication devices, and other devices that can send and receive data over the network 102. A user device 106 can include a user application, such as a web browser, to facilitate the sending and receiving of data over the network 102. A user device 106 can request resources 105 from a website 104. In turn, data representing the resource 105 can be provided to the user device 106 for presentation by the user device 106. The data representing the resource 105 can include data specifying a portion of the resource or a portion of a user display (e.g., a presentation location of a pop-up window or in a slot of a web page) in which content items can be presented. These specified portions of the resource 105 or user display are referred to as content item slots.

To facilitate searching of the vast number of resources 105 accessible over the network 102, the environment 100 can include a search system 112 that identifies the resources 105 by crawling and indexing the resources 105 provided on the websites 104, for example. Data about the resources 105 can be indexed based on the resource 105 with which the data is associated. The indexed and, optionally, cached copies of the resources 105 are stored in a search index (not shown).

User devices 106 can submit search queries to the search system 112 over the network 102. In response, the search system 112 accesses the search index to identify resources 105 that are relevant to the search query. In one illustrative embodiment, a search query includes one or more keywords. The search system 112 identifies the resources 105 that are responsive to the query, provides information about the resources 105 in the form of search results and returns the search results to the user devices 106 in search results pages. A search result can include data generated by the search system 112 that identifies a resource 105 that is responsive to a search query, and can include a link to the resource 105. An example search result can include a web page title, a snippet of text or a portion of an image extracted from the web page 104, a rendering of the resource 105, and the URL of the web page 104. Search results pages can also include one or more content item slots in which content items can be presented.

A search result page can be sent with a request from the search system 112 for the web browser of the user device 106 to set an HTTP (HyperText Transfer Protocol) cookie. A cookie can represent, for example, a user device 106 and a web browser. For example, the search system 112 includes a server that replies to the query by sending the search results page in an HTTP response. This HTTP response includes instructions (e.g., a set cookie instruction) that cause the browser to store a cookie for the site hosted by the server or for the domain of the server.

When a resource 105 or search results are requested by a user device 106 or provided to the user device 106, the content item management system 110 receives a request for content items to be provided with the resource 105 or search results. The request for content items can include characteristics of the content item slots that are defined for the requested resource 105 or search results page, and can be provided to the content item management system 110.

For example, a reference (e.g., URL) to the resource 105 for which the content item slot is defined, a size of the content item slot, and/or media types that are available for presentation in the content item slot can be provided to the content item management system 110. Similarly, keywords (i.e., one or more words that are associated with content) associated with a requested resource 105 ("resource keywords") or a search query for which search results are requested can also be provided to the content item management system 110 to facilitate identification of content items that are relevant to the resource 105 or search query.

Based on data included in the request for content items, the content item management system 110 can select content items that are eligible to be provided in response to the request ("eligible content items"). For example, eligible content items can include content items having characteristics matching the characteristics of content item slots and that are identified as relevant to specified resource keywords or search queries. In some implementations, content items having targeting keywords that match the resource keywords, the search query, or portions of the search query are selected as eligible content items by the content item management system 110.

The content item management system 110 can select an eligible content item for each content item slot of a resource 105 or of a search results page. The resource 105 or search results page can be received by the user device 106 for presentation by the user device 106. User interaction data representing user interactions with presented content items can be stored in a historical data store 119. For example, when a content item is presented to the user via a content item server 114, data can be stored in a log file 116. This log file 116 can be aggregated with other data in the historical data store 119.

Accordingly, the historical data store 119 includes data representing the content item impression. For example, the presentation of a content item can be stored in response to a request for the content item that is presented. For example, the content item request can include data identifying a cookie, such that data identifying the cookie can be stored in association with data that identifies the content item(s) that were presented in response to the request. In some implementations, the data can be stored directly to the historical data store 119.

Similarly, when a user selects (i.e., clicks) a presented content item, data representing the selection of the content item can be stored in the log file 116, a cookie, or the historical data store 119. In some implementations, the data is stored in response to a request for a web page that is linked to by the content item. For example, the user selection of the content item can initiate a request for presentation of a web page that is provided by (or for) the content item provider. The request can include data identifying the cookie for the user device, and this data can be stored.

User interaction data can be associated with unique identifiers that represent a corresponding user device with which the user interactions were performed. For example, in some implementations, user interaction data can be associated with one or more cookies. Each cookie can include information that specifies an initialization time that indicates a time at which the cookie was initially set on the user device 106.

The log files 116, or the historical data store 119, also can store references to content items and data representing conditions under which each content item was selected for presentation to a user. For example, the historical data store 119 can store targeting keywords, bids, and other criteria with which eligible content items are selected for presentation. Additionally, the historical data store 119 can include data that specifies a number of impressions for each content item and the number of impressions for each content item can be identified, for example, using the keywords that caused the content item impressions and/or the cookies that are associated with the impressions. Data for each impression can also be stored so that each impression and user selection can be associated with (i.e., stored with references to and/or indexed according to) the content item that was selected and/or the targeting keyword that caused the content item to be selected for presentation.

The content item providers 108 can submit, to the content item management system 110, campaign parameters (e.g., targeting keywords and corresponding bids) that are used to control distribution of content items. The content item providers 108 can access the content item management system 110 to analyze performance of the content items that are distributed using the campaign parameters. For example, a content item provider can access a campaign performance report that provides a number of impressions (i.e., presentations), selections (i.e., clicks), and conversions that have been identified for the content items.

The campaign performance report can also provide a total cost, a cost-per-click, and other cost measures for the content item over a specified period of time. For example, a content item provider can access a performance report that specifies that content items distributed using the phrase match keyword "hockey" have received 1,000 impressions (i.e., have been presented 1,000 times), have been selected (e.g., clicked) 20 times, and have been credited with 5 conversions. Thus, the phrase match keyword hockey can be attributed with 1,000 impressions, 20 clicks, and 5 conversions.

As described above, reports that are provided to a content item provider can specify performance measures measuring user interactions with content that occur prior to a conversion. A conversion occurs when a user performs a specified action, and a conversion path includes a conversion and a set of user interactions occurring prior to the conversion by the user. Any appropriate user interaction or user interactions can be deemed a conversion. What constitutes a conversion may vary from case to case and can be determined in a variety of ways. For example, a conversion may occur when a user clicks on a content item, is referred to a web page or website, and then consummates a purchase there before leaving the web page or website. As another example, a conversion may occur when a user spends more than a given amount of time on a website. Data from multiple user interactions can be used to determine the amount of time at the website.

Actions that constitute a conversion can be specified by each content item provider. For example, each content item provider can select, as a conversion, one or more measurable/observable user actions such as, for example, downloading a white paper, navigating to at least a given depth of a website, viewing at least a certain number of web pages, spending at least a predetermined amount of time on a website or web page, or registering on a website. Other actions that constitute a conversion can also be used.

For example, to identify conversions (and other user interactions), a content item provider can include, in the content item provider's web pages, embedded instructions that correlate user interactions (e.g., page selections, content item selections, and other interactions) with the content item provider's website, and can identify a user interaction (or series of user interactions) that constitutes a conversion. In some implementations, when a user accesses a web page, or another resource, from a referring web page (or other resource), the referring web page (or other resource) for that interaction can be identified, for example, by execution of a snippet of code that is referenced by the web page that is being accessed and/or based on a URL that is used to access the web page.

For example, a user can access a content item provider's website by selecting a link presented on a web page, for example, as part of a promotional offer. This link can be associated with a URL that includes data (i.e., text) that uniquely identifies the resource from which the user is navigating. The user interaction data for this interaction (i.e., the selection of the link) can be stored in a database and used, as described below, to facilitate performance reporting.

When a conversion is identified for a content item provider, conversion data representing the conversion can be transmitted to a data processing apparatus ("analytics apparatus") that receives the conversion data, and in turn, stores the conversion data in a data store. This conversion data can be stored in association with one or more cookies for the user device that was used to perform the user interaction, such that user interaction data associated with the cookies can be associated with the conversion and used to generate a performance report for the conversion.

A conversion cycle is a period that begins when a user is presented a content item and ends at a time at which the user takes action that constitutes a conversion. A conversion cycle can be measured and/or constrained by time or actions and can span multiple user sessions. Each user session can include data representing user interactions within a session window (i.e., a specified period). The session window can be, for example, a specified period of time (e.g., 1 hour, 1 day, or 1 month) or can be delineated using specified actions. For example, a user search session can include user search queries and subsequent actions that occur over a 1 hour period and/or occur prior to a session ending event (e.g., closing of a search browser).

Analysis of a conversion cycle can enhance a content item provider's ability to understand how its customers interact with content items over a conversion cycle. For example, if a content item provider determines that many of the users that convert do so after presentation of content items that are associated with a particular keyword, the content item provider may want to increase the amount of money (e.g., bid amount) that it spends on content items distributed using that keyword and/or increase the quality of content items that are associated with that particular keyword.

Measures of user interactions that facilitate analysis of a conversion cycle are referred to as conversion path performance measures. A conversion path is a set of user interactions by a user prior to and including a conversion by the user. Conversion path performance measures specify durations of conversion cycles, numbers of user interactions that occurred during conversion cycles, paths of user interactions that preceded a conversion, numbers of user interactions that occurred preceding conversions, as well as other measures of user interaction that occurred during conversion cycles, as described in more detail below.

The content item management system 110 can include a performance analysis apparatus 120 to determine conversion path performance measures that specify measures of user interactions with content items during conversion cycles. The performance analysis apparatus 120 can measure, for each content item provider, user interactions with content items that are provided by the content item provider, determine (i.e., compute) one or more conversion path performance measures, and provide data that cause presentation of a performance report specifying at least one of the conversion path performance measures.

Using the performance report, the content item provider can analyze its conversion cycle, and learn how each of its keywords cause presentation of content items that facilitate conversions, irrespective of whether the keywords caused presentation of the last selected content item. In turn, the content item provider can adjust campaign parameters that control distribution of its content items based on the performance report.

Conventionally, performance reports are based on attribution models estimating the performance of marketing channels in a single position of the interaction path. For example, a performance report can be based on a "last interaction" attribution model, i.e., the conversions that show a certain marketing channel or activity as the last interaction before conversion occurs.

For example, an attribution credit that is determined by applying a "last interaction" attribution model can be attributed to a targeting keyword when a content item that is associated with the targeting keyword is the last clicked content item prior to the conversion. For example, content item provider X may associate the keywords "tennis," "shoes," and "Brand-X" with content items. In this example, assume that a user submits a first search query for "tennis," the user is presented a search result page that includes content item provider X's content item, and the user selects the content item, but the user does not take an action that constitutes a conversion.

Assume further that the user subsequently submits a second search query for "Brand-X," is presented with the content item provider X's content item, the user selects content item provider X's content item, and the user takes action that constitutes a conversion (e.g., the user purchases Brand-X tennis shoes). In this example, the keyword "Brand-X" will be credited with the conversion because the last content item selected prior to the conversion ("last selected content item") was a content item that was presented in response to the "Brand-X" being matched.

Providing attribution credit to the keyword that caused presentation of the last selected content item ("last selection attribution credit") prior to a conversion is a useful measure of content item performance, but this measure alone does not provide content item providers with data that facilitates analysis of a conversion cycle that includes user exposure to, and/or selection of, content items prior to the last selected content item. For example, last selection attribution credit measures alone do not specify keywords that may have increased brand or product awareness through presentation of content items that were presented to, and/or selected by, users prior to selection of the last selected content item. However, these content items may have contributed significantly to the user subsequently taking action that constituted a conversion.

In the example above, the keyword "tennis" is not provided a credit for the conversion, even though the content item that was presented in response to a search query matching the keyword "tennis" may have contributed to the user taking an action that constituted a conversion (e.g., making a purchase of Brand-X tennis shoes). For instance, upon user selection of the content item that was presented in response to the keyword "tennis" being matched, the user may have viewed Brand-X tennis shoes that were available from Brand-X. Based on the user's exposure to the Brand-X tennis shoes, the user may have subsequently submitted the search query "Brand-X" to find the tennis shoes from Brand-X.

Similarly, the user's exposure to the content item that was associated with the keyword "tennis," irrespective of the user's selection of the content item, may have also contributed to the user subsequently taking action that constituted a conversion (e.g., purchasing a product from Brand-X). Analysis of user interactions with content items that occur prior to selection of the last selected content item can enhance a content item provider's ability to understand the conversion cycle.

The described techniques can provide a framework in which content item providers can analyze current spend and conversion behavior by evaluating attribution credits along the whole conversion path, including interactions of a user prior to a conversion event. For example, understanding the current spend and conversion behavior can serve as a basis to identify new opportunity spaces, such as marketing spend changes.

In some implementations, new opportunity spaces can be identified by characterizing a content item provider's current spend from an attribution perspective, and then characterizing the magnitude of various different attribution-related opportunities associated with increasing and/or shifting spend. For example, in cases where the magnitude of the attribution-related opportunity is small, it can be advantageous for a content item provider to know that the spend on these marketing activities is not very attribution sensitive. On the other hand, in cases where the magnitude of the attribution-related opportunity is large, a content item provider can, for example, modify the spend on these marketing activities, or run an experiment to measure the conversion-related impact of the opportunity. Marketing activities can be, for example, clicks on (paid) keywords, search terms, etc. in (advertising) campaigns (e.g., display advertising, video advertising, advertising on a mobile device, etc.)

Figure 1B:
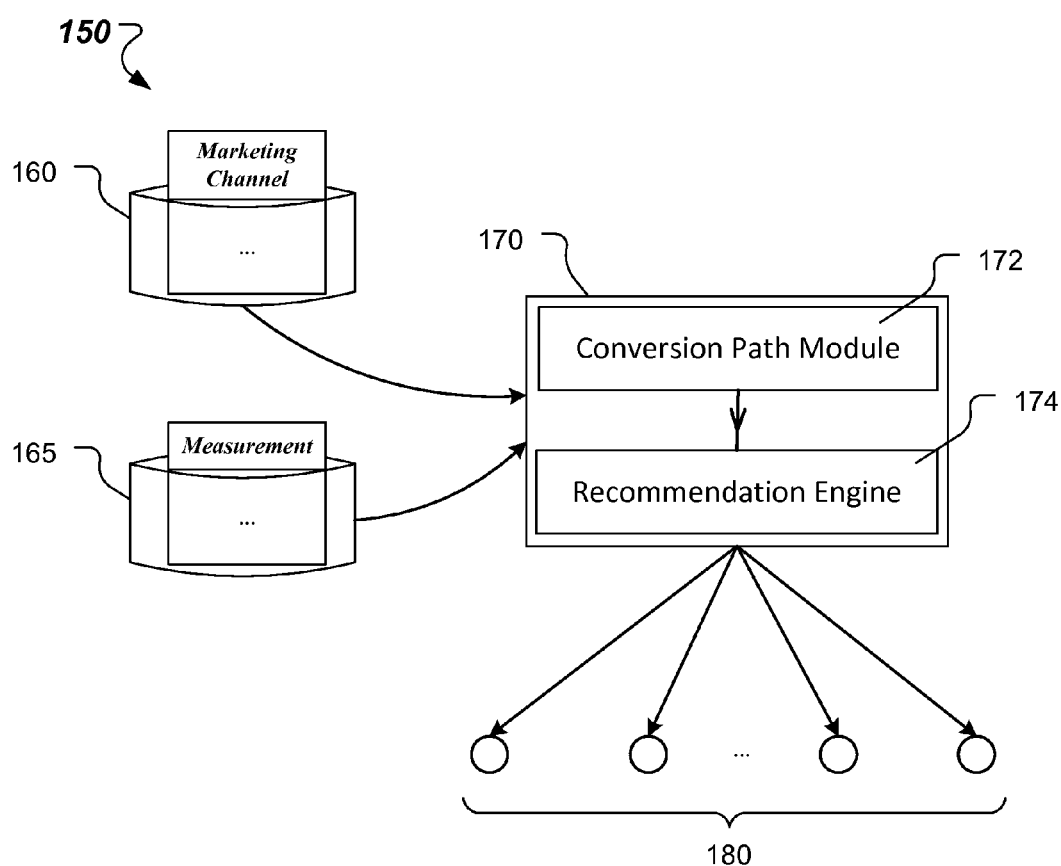
FIG. 1B shows an example of an attribution model evaluation system.

FIG. 1B shows an example of an attribution model evaluation system 150. In some implementations, the attribution model evaluation system 150 can be a component of the performance analysis apparatus 120 and/or the content item management system 110. The attribution model evaluation system 150 can include marketing channel database 160, a measurement database 165, and a data processing module 170. In some implementations, the marketing channel database 160 and the measurement database 165 can be a single database, such as database 119.

The marketing channel database 160 can include information relating to various marketing channels, such as spend data (e.g., keyword bid information, etc.) and performance data (e.g., clicks, impressions, etc.). The measurement database 165 can include conversion data and attribution data. The information stored in the marketing channel database 160 and/or the measurement database 165 can be provided to the data processing module 170. The data processing module 170 can include a conversion path analysis module 172 and a recommendation engine 174 to evaluate the received information.

The conversion path module 172 can analyze the information received from the marketing channel database 160 and/or the measurement database 165 for various positions in the conversion path, for example, by applying various attribution models to the received information.

The recommendation engine 174 can quantify one or more opportunity spaces 180 based on the analyzed information. In some implementations, opportunity spaces 180 can be additional spend opportunities (e.g., placing/increasing bids on keywords that appear valuable) or areas where spend may not be effective and could be adjusted (e.g., lowering/removing bids on keywords that appear ineffective). For example, a given attribution model can be a quantification of spend performance at a respective position in the conversion path. By analyzing and comparing more than one position in the conversion path, relevant and well performing positions can be identified. Attribution credits for relevant user activity can be generated based on respective attribution models.

The recommendation engine 174 can output spend opportunity information and/or performance opportunity information to identify opportunity space(s) 180 for the content item provider, for example. When comparing output of the various attribution models, the recommendation engine 174 can identify whether opportunity spaces may be available in a lower portion of the conversion path (e.g., at the beginning of the conversion cycle) or in a upper portion of the conversion path (e.g., towards the end of the conversion cycle). Similarly, the recommendation engine 174 can identify whether a budget shift (e.g., from the lower portion to the upper portion of the conversion path or vice versa) may provide better spend performance for the content item provider (e.g., change bids on keywords).

In some implementations, a reference attribution model can be compared to an alternative attribution model to evaluate the spend performance of the content item provider. The reference attribution model can be the attribution model that the content item provider currently applies (e.g., a "last click" attribution model) to evaluate the spend performance. The alternative attribution model is an attribution model to which the reference attribution model is compared to identify potential opportunity spaces for the content item provider.

Figure 2:
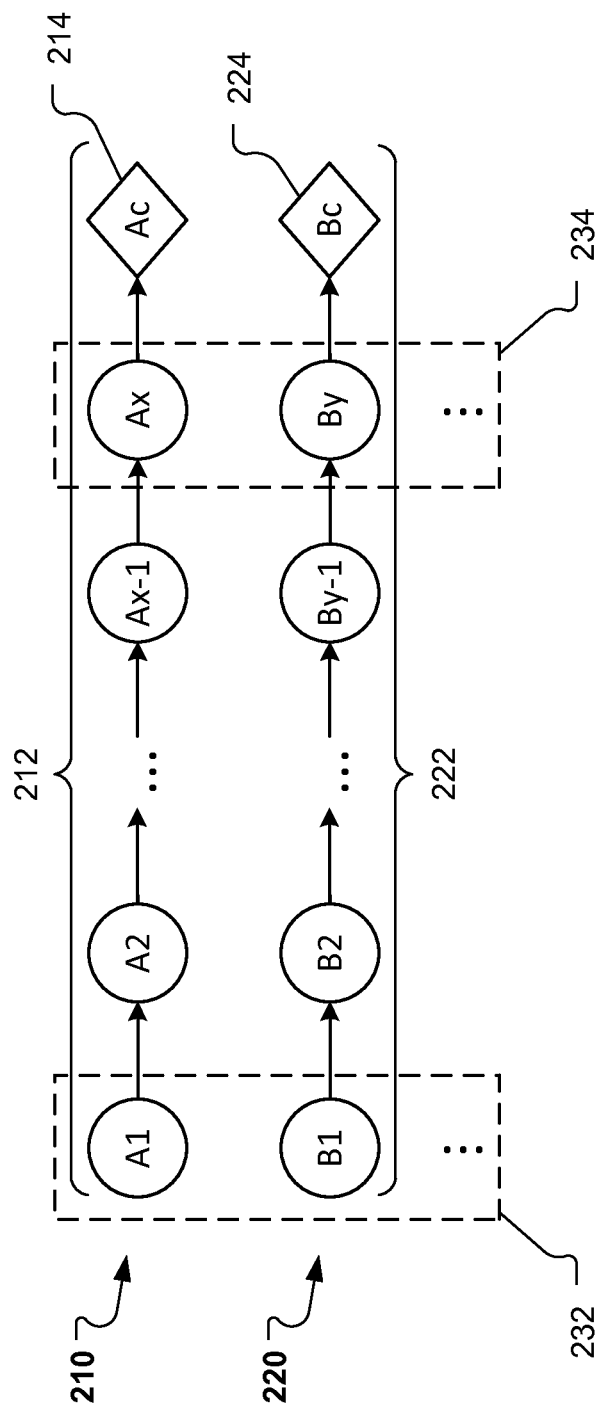
FIG. 2 shows example conversion paths from initial user interaction to conversion.

FIG. 2 shows example conversion paths from initial user interaction to conversion. Different attribution models can analyze different positions in the respective conversion paths. As described above, each conversion path can have several user interactions with the content item (also referred to as touch points) staring with an initial user interaction and ending with a conversion. In this example, conversion path 210 describes interactions with a content item of user A and conversion path 220 describes interaction with the content item of user B. Though only two example conversion paths are shown in FIG. 2, the techniques describes herein can be performed on any number of conversion paths (e.g., several 100s or 1000s).

In this example, conversion paths 210 and 220 include multiple user interactions 212 (A1, A2, . . . , Ax-1, Ax, and Ac) and 222 (B1, B2, . . . , By-1, By, and Bc) respectively. Each conversion path can have a number of user interactions with a content item prior to conversion, from only a few (e.g., about 1-10, 10-50, etc.) to a large number (e.g., 50-100 or more). The user interactions can be digital marketing interactions (e.g., viewing display ads, video ads, or mobile ads), paid interactions (e.g., paid search clicks), and conversions (e.g., purchase), for example, or any combination thereof.

In this example, the user interactions 232 (i.e., A1 and B1) are the initial user interactions (e.g., first click events) of the respective conversion path. The user interactions 234 (i.e., Ax and By) are the last user interactions prior to conversion (e.g., last click events) of the respective conversion path. The user interactions 214 and 224 (i.e., Ac and Bc) are the conversion events (e.g., purchase) of the respective conversion path.

A given attribution model can be the quantification of spend performance at one position in a conversion path. However, as described above, more than one position in a conversion path can be relevant and influential.

Attribution credits for relevant positions in the conversion path (e.g., last click and first click) can be generated by applying an attribution models to estimate the performance at the respective positions in the conversion path. In some implementations, one of the applied attribution models can be a reference attribution model (e.g., a last click attribution model), i.e., an attribution model the content item provider currently applies to measure and analyze conversions. Other attribution models can be alternative attribution models (e.g., a first click attribution model) to evaluate different positions in the conversion path, which the content item provider may not consider in measuring and analyzing conversions based on the reference attribution model.

For example, by applying a last click attribution model, an attribution credit for the last click events in the conversion path can be calculated, and by applying a first click attribution model, an attribution credit for the first click events in the conversion path can be calculated. Thus, each attribution model can generate a respective attribution credit.

Calculating the attribution credit under different attribution models can generate numeric figures for each attribution model with respect to the marketing activity (e.g., a paid search click keyword). In some implementations, the marketing activities can be ranked by their impact relative to the reference attribution model by creating a ratio metric from the calculated attribution credits. Thus, based on comparing the reference attribution model with alternative attribution models, high performing marketing activities can be identified that otherwise may be missed by the content item provider.

Figure 3:
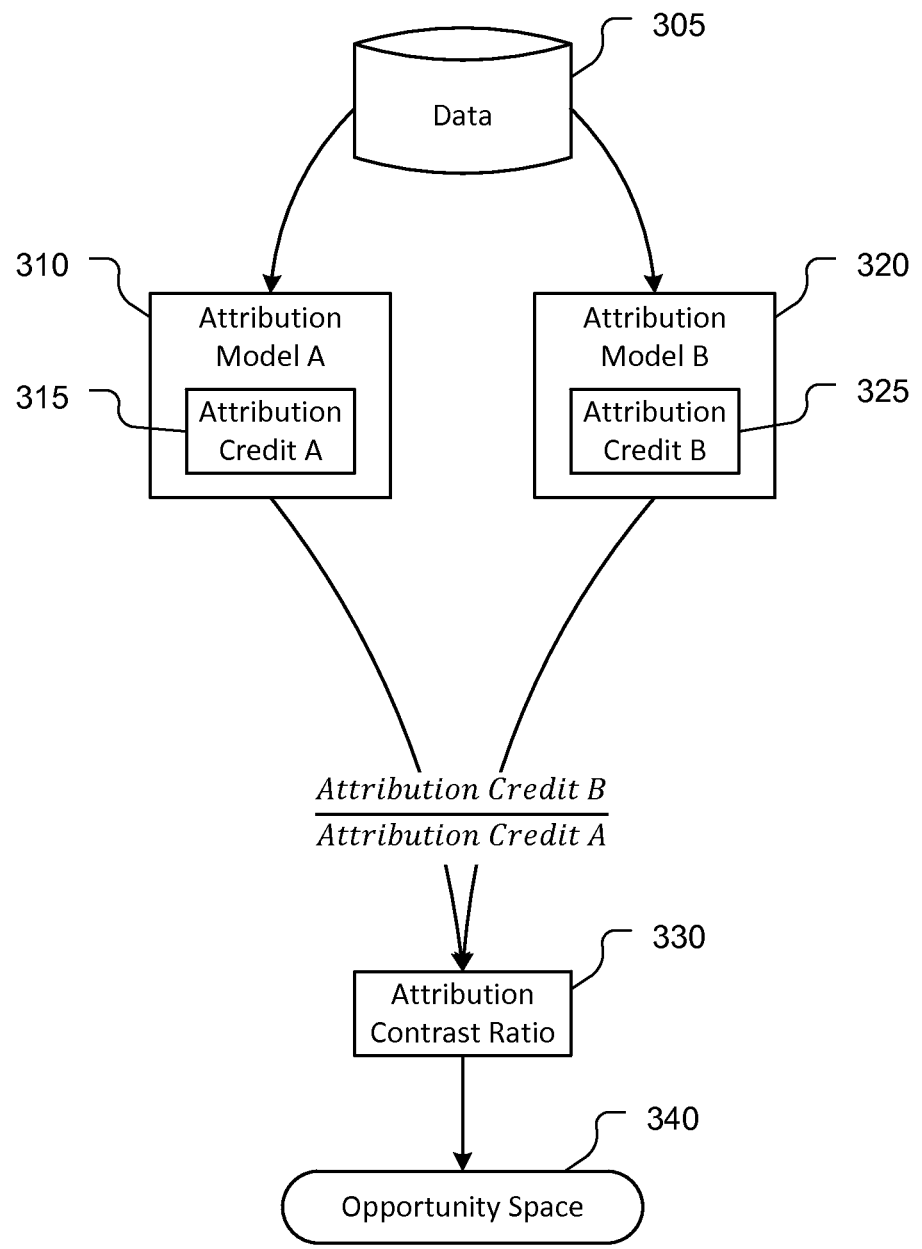
FIG. 3 shows an example of a process for identifying opportunity spaces for marketing activities based on an attribution contrast ratio.

FIG. 3 shows an example of a process 300 for identifying opportunity spaces for marketing activities based on an attribution contrast ratio. In this example, data 305 (e.g., spend data, performance data, conversion data, attribution data, etc.) can be input into attribution model 310 (i.e., a reference attribution model) and attribution model 320 (i.e., an alternative attribution model). An attribution credit 315 and an attribution credit 325 can be calculated by applying attribution model 310 and attribution model 320 respectively. The output of the attribution models 310 and 320 can be compared, for example, by generating an attribution contrast ratio 330 based on the calculated attribution credits 315 and 325. With the attribution contrast ratio 330, opportunity spaces 340 for the marketing activity can be identified. For example, an attribution ratio greater than 1 can indicate that an alternative attribution model values the contributions of the respective marketing activity more than a reference attribution model, and thus, additional opportunity spaces based on the alternative attribution model can be identified.

The following description of a specific opportunity space identification process serves as an example for various implementations and not as limiting the claimed subject matter. In this example, the marketing channel is search advertising, the attribution model 310 (i.e., the reference attribution model) is a last-click attribution model, and the attribution model 320 (i.e., the alternative attribution model) is a first-click attribution model. A keyword (e.g., a search term) can be associated with a content item (e.g., an advertisement). Thus, a click on the content item is associated with the keyword. For example, a search by a user that includes the keyword "haircut" can produce content items that are associated with the keyword "haircut". If the user clicks on the retrieved content item(s), the click is associated with the keyword "haircut".

For this example, the data 305 includes information that keyword K1 was clicked last in 10 out of 100 conversion paths and first in 25 out of 100 conversion paths. The attribution credit 315 (in this case the last click attribution credit AC315) can be determined by applying the attribution model 310, and the attribution credit 325 (in this case the first click attribution credit AC325) can be determined by applying the attribution model 320. The attribution credit of a marketing activity (e.g., click on a search term) in a conversion path is the credit associated with the position of that activity in the conversion path for the selected attribution model.

For example, for a single marketing activity in the conversion path (e.g., a first click on a keyword in the conversion path), the respective attribution model (e.g., first click attribution model) would generate a value of 1, whereas attribution models corresponding to other positions (e.g., a last click attribution model) in the conversion path would generate a value of 0 for the single marketing activity. The attribution credit of a marketing activity is the sum of the individual conversion path credits corresponding to a given attribution model relative to all conversion paths for the marketing activity.

In this example, the attribution credit 315 is determined by $$\frac{K1 lastclicks}{totalconversionpaths}$$

and the attribution credit 325 is determined by $$\frac{K1 firstclicks}{totalconversionpaths},$$

therefore, the attribution credit 315 for the keyword K1 is 0.1 or 10% and the attribution credit 325 for the keyword K1 is 0.25 or 25%.

In some implementations, an attribution contrast ratio 330 (ACR) can be calculated based on a ratio of the attribution credits 315 and 325. In this example, the attribution contrast ratio for the keyword K1 is: $ACR_{K1}=AC325_{K1}/AC315_{K1}=0.25/0.1=2.5$.

For a keyword K2 that, for example, was clicked last in 35 out of 100 conversion paths and first in 15 out of 100 conversion paths, the attribution contrast ratio is: $ACR_{K2}=AC325_{K2}/AC315_{K2}=0.15/0.35=0.43$.

Based on the determined attribution contrast ratio, opportunity space(s) 340 can be identified. For example, an attribution contrast ratio greater than 1 (e.g., keyword K1) indicates that one attribution model (in this example the alternative attribution model with respect to keyword K1) values the marketing activity more than another attribution model (e.g., the reference attribution model), and thus, there is an opportunity to consider and/or evaluate an alternative marketing strategy that may be more productive.

In the example described above, the attribution credit 330 for the keyword K1 is 2.5, and thus, the keyword K1 is more frequently clicked at the beginning than at the end of the conversion path. Since the first click attribution model was the alternative attribution model in this example, an opportunity space (e.g., adding/increasing bids on keyword K1) has been identified for the content item provider that would not have been visible to the content item provider under the reference attribution model alone.

An attribution contrast ratio smaller than 1 (e.g., keyword K2) indicates that one attribution model (in this example the alternative attribution model with respect to keyword K2) values the marketing activity less than another attribution model (e.g., the reference attribution model). In the example described above, the attribution credit 330 for the keyword K2 is 0.43, and thus, the keyword K2 is more frequently clicked at the end than at the beginning of the conversion path. Based on this information, the content item provider can shift or adjust spend to increase overall campaign performance, for example.

An attribution contrast ratio equal to 1 (e.g., a keyword is clicked equally frequent at the beginning and at the end of the conversion path) indicates that valuation of the marketing activity is equal under the reference and the alternative attribution model. An attribution value of 0 that is output by the reference attribution model, or the alternative attribution model, indicates that the respective attribution model does not place any value on the marketing activity at the respective position in the conversion path (e.g., there were no marketing activities at the respective position in any conversion path).

With respect to the above example, an attribution credit 325 of 0 would result in an attribution contrast ratio 330 of 0, and thus, indicates that there is no first click relevance in the conversion path for the respective keyword (e.g., a pure last click opportunity). An attribution credit 315 of 0 would result in an undefined attribution contrast ratio 330, and thus, indicates that there is not last click relevance in the conversion path for the respective keyword (e.g., a pure first click opportunity).

Based on the evaluation of the attribution contrast ratio with respect to the reference and alternative attribution models, opportunity spaces, such as undervalued or overvalued keywords, can be identified. For example, by comparing a reference attribution model with one or more alternative attribution models opportunity spaces that would otherwise not be visible to the content item provider can be identified. These opportunity spaces can be presented and/or recommended to the content item provider (e.g., recommendations for adding/modifying bids for keywords) to expand marketing options and therefore the opportunity to improve campaign performance.

Figure 4:
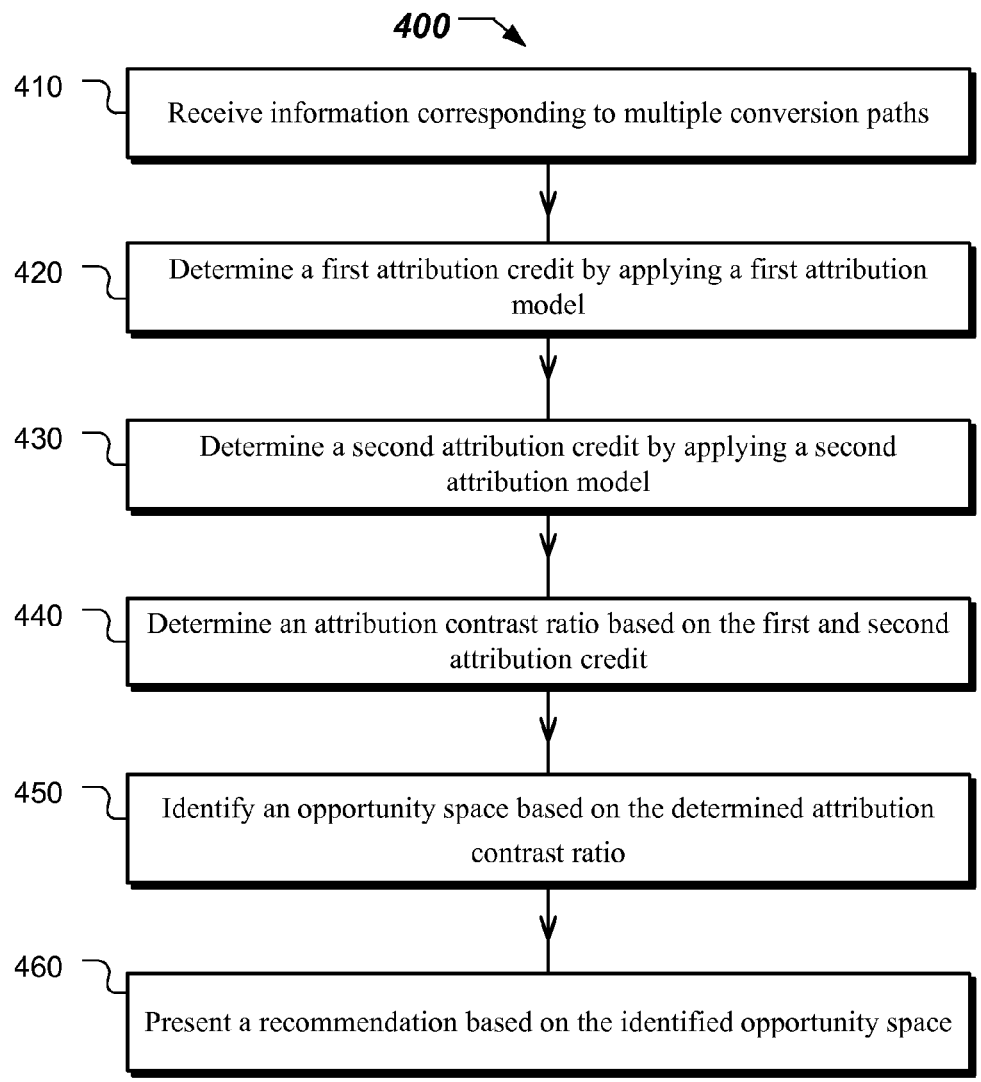
FIG. 4 shows another example of a process to identify and recommend opportunity spaces.

FIG. 4 shows an example of a process 400 to identify and recommend opportunity spaces, for example, to a content item provider. At 410, information corresponding to one or more conversion paths can be received. The information can include data relating to user interactions with a content item. The content item can be associated with one or more marketing activities (e.g., search keywords). At 420, a first attribution credit can be determined by applying a first attribution model to at least a portion of the received information. In some implementations, the first attribution model can be a reference attribution model (e.g., an attribution model a content item provider currently applies to analyze the performance of marketing activities at a given position in the conversion path).

At 430, a second attribution credit can be determined by applying a second attribution model to at least a portion of the received information. In some implementations, the second attribution model can be an alternative attribution model (e.g., an attribution model that applies to a position in the conversion path different from the reference attribution model). In some implementations, the attribution credit can be a ratio of a number of user interactions and a total number of conversion paths with respect to a marketing activity.

At 440, an attribution contrast ratio can be determined based on the first and second attribution credit. For example, the attribution contrast ratio can be determined by dividing the second attribution credit by the first attribution credit. Based on the determined attribution contrast ratio, one or more opportunity space(s) can be identified at 450. For example, an attribution contrast ratio greater than one indicates that the marketing activity performs well under the second attribution model, whereas an attribution contrast ratio less than one indicates that the marketing activity performs better under the first attribution model. In some implementations, the contribution contrast ratio can be determined by the difference between the second attribution credit and the first attribution credit.

At 460, a recommendation based on the identified opportunity space(s) can be made for the respective marketing activity. For example, if the content item provider has not analyzed the marketing activity by applying the second attribution model, the content item provider may not be aware of this opportunity space. For an attribution contrast ratio greater than one, this new opportunity space can be recommended to the content item provider (e.g., adding/increasing a bid for the marketing activity).

Figure 5:
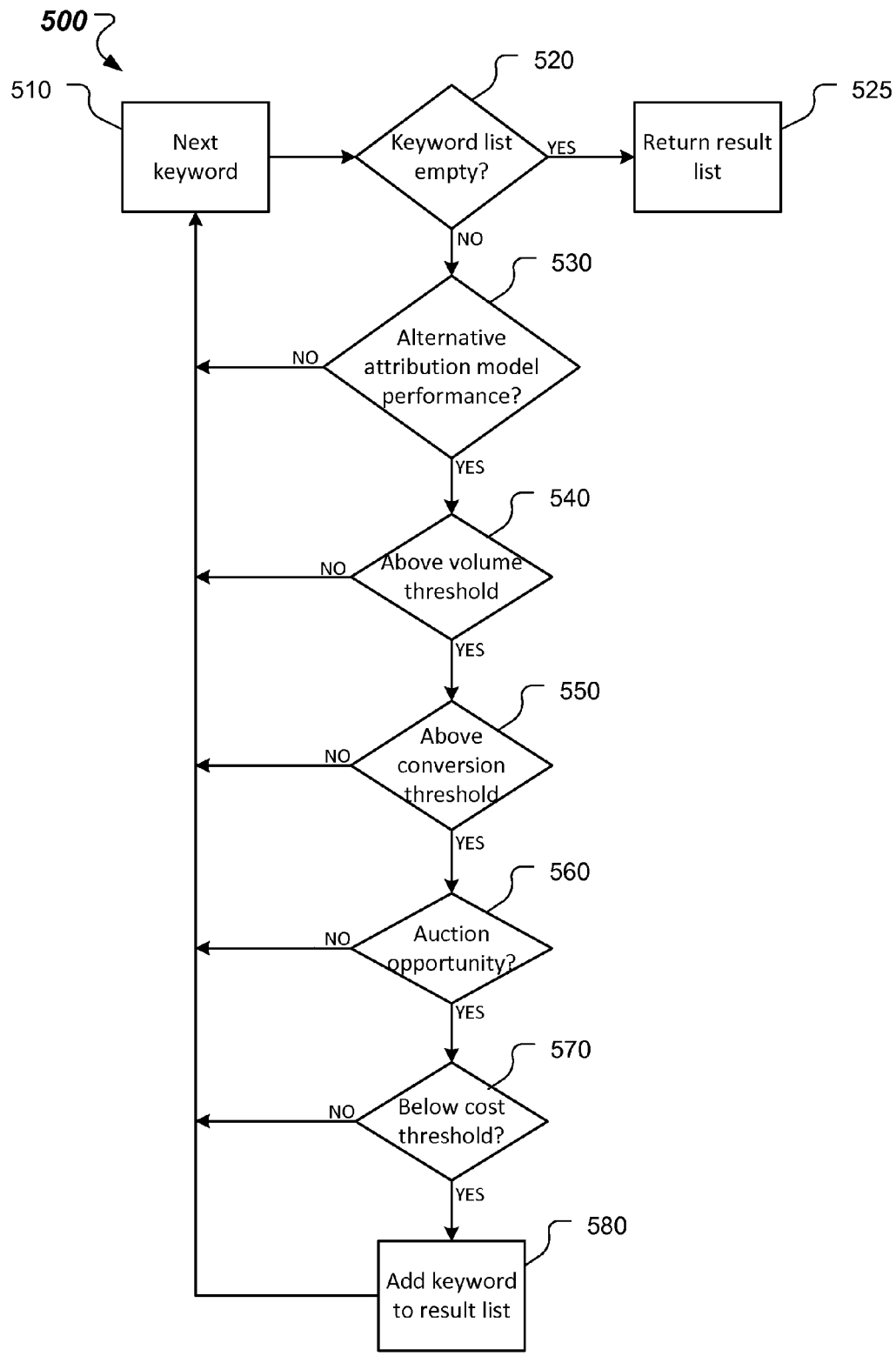
FIG. 5 shows an example of a recommendation engine for keywords.

FIG. 5 shows an example of a recommendation engine 500 for keywords. At 510, if available, a keyword for analysis is selected. If the keyword list is not empty at 520, the performance of the selected keyword (e.g., attribution contrast ratio) with respect to an alternative attribution model can be analyzed at 530. If the attribution contrast ratio is smaller than a predefined threshold value (e.g., <1) the process can return to 510 and select a next keyword for analysis. If the attribution contrast ratio is greater than a predefined threshold value (e.g., >=1), a series of criteria (e.g., performance indicators), such as impressions, clicks, conversions, costs, content item position, etc., can be applied to identify whether a recommendation of the keyword should be made.

For example, at 540, the keyword performance with respect to volume (e.g., number of impressions and clicks) can be compared to a predetermined volume threshold (e.g., above the $50^{th}$ percentile of impressions and clicks), at 550, the keyword performance with respect to conversions (e.g., number of purchases) can be compared to a predetermined conversion threshold (e.g., above the $50^{th}$ percentile of conversions), at 560, an auction opportunity (e.g., average content item slot position) for the keyword can be compared to a predetermined threshold (e.g., the average slot position is <=than 2), and at 570, the cost of the keyword (e.g., bid amount) can be compared to a cost threshold (e.g., below the $50^{th}$ percentile of average an keyword cost).

The keywords that pass the predefined set of criteria can be added to a keyword result list at 580. The predefined set of criteria can be any combination of criteria and adjusted to various applications (e.g., focused on specific content item providers). If no further keyword is available for analysis at 510 and thus, the keyword list is empty at 520, the result list can be returned at 525 (e.g., a list of keywords for which recommendations can be provided).

With the described process, different positions in the conversion path can be evaluated with respect to keyword performance and recommendations for undervalued and/or overvalued keywords can be presented to content item providers. With this information, content item providers can better understand user behavior that leads up to a conversion and discover opportunities along the conversion path that can be presented in actionable form (e.g., adding/modifying keyword bids).

Figure 6:
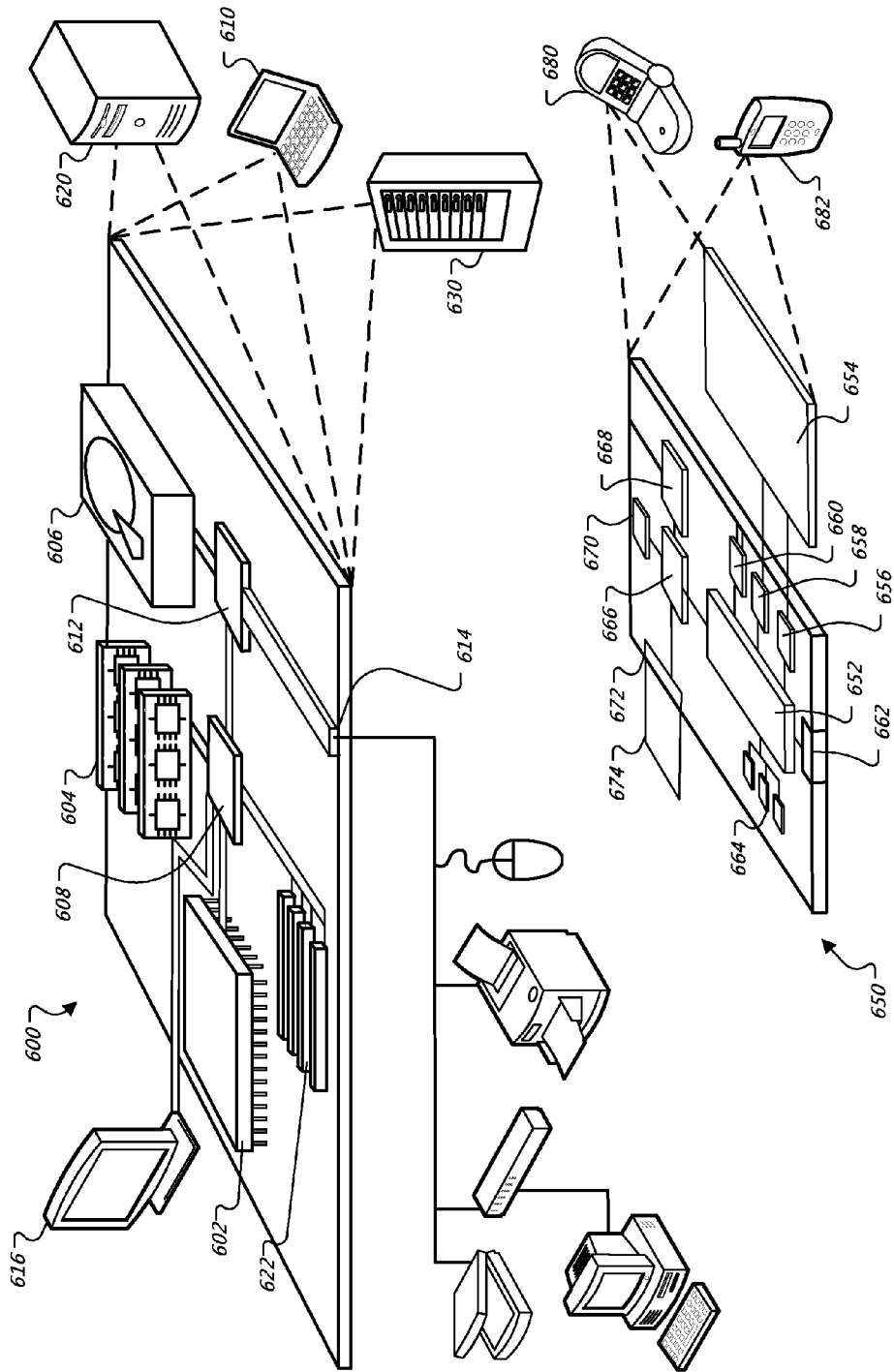
FIG. 6 shows an example of a computer device and a mobile computer device that can be used to implement the technologies described herein.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 622, and a low speed interface 612 connecting to low speed bus 614 and storage device 606. Each of the components 602, 604, 606, 608, 622, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 622, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 630. In addition, it may be implemented in a personal computer such as a laptop computer 610. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate e implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatuses, the method comprising:
    receiving information corresponding to a plurality of conversion paths that each end with a respective conversion and each include a set of user interactions that occurred prior to the respective conversion by a respective user, the information including data relating to user interactions with a content item in the plurality of conversion paths within a marketing channel, wherein the content item is associated with one or more marketing activities;
    determining a first attribution credit that is based on a number of the plurality of conversion paths within the marketing channel and on a number of user interactions with the content item at a particular position in the plurality of conversion paths within the marketing channel;
    determining a second attribution credit that is based on the number of the plurality of conversion paths within the marketing channel and on a number of user interactions with the content item at a different particular position in the plurality of conversion paths within the marketing channel;
    based on the first attribution credit and the second attribution credit, determining an attribution contrast ratio that quantifies an effect of the content item at the particular position in the plurality of conversion paths within the marketing channel to an effect of the content item at the different particular position in the plurality of conversion paths within the marketing channel;
    identifying an opportunity based on the determined attribution contrast ratio, wherein identifying the opportunity comprises identifying marketing activities that are undervalued, and wherein an undervalued marketing activity has an attribution contrast ratio greater than a predefined number; and
    responsive to determining that a marketing activity, in the one or more marketing activities, associated with the content item is undervalued:
        presenting a recommendation for the marketing activity based on the identified opportunity, wherein the recommendation includes a bid value for the marketing activity within the marketing channel.

2. The method of claim 1, wherein the attribution contrast ratio is determined by dividing the second attribution credit by the first attribution credit.

3. The method of claim 1, wherein the attribution contrast ratio is determined by the difference between the second attribution credit and the first attribution credit.

4. The method of claim 1, wherein the particular position in the plurality of conversion paths is an initial position in the plurality of conversion paths and the different particular position in the plurality of conversion paths is a last position in the plurality of conversion paths.

5. The method of claim 1, wherein the first attribution credit is an attribution model currently used by a content item provider and the second attribution credit is an alternative attribution model.

6. The method of claim 1, wherein the marketing activity corresponds to one or more keywords.

7. The method of claim 1, wherein the marketing channel is a single marketing channel, and the content item is an advertisement.

8. The method of claim 1, wherein the opportunity is an opportunity to adjust spending for the marketing activity.

9. The method of claim 8, wherein adjusting spending for the marketing activity comprises placing or modifying bids on keywords.

10. The method of claim 1, wherein:
the first attribution credit is a ratio of the number of user interactions with the content item at the particular position in the plurality of conversion paths within the marketing channel to the number of the plurality of conversion paths within the marketing channel, and
the second attribution credit is a ratio of the number of user interactions with the content item at the different particular position in the plurality of conversion paths within the marketing channel to the number of the plurality of conversion paths within the marketing channel.

11. The method of claim 1, wherein each conversion path includes a sequential series of impressions of the content item and each impression is associated with user interaction or with an absence of user interaction.

12. A system comprising:
one or more computer systems and one or more storage devices storing instructions that are operable, when executed by the one or more computer systems, to cause the one or more computer systems to perform operations comprising:
receiving information corresponding to a plurality of conversion paths that each end with a respective conversion and each include a set of user interactions that occurred prior to the respective conversion by a respective user, the information including data relating to user interactions with a content item in the plurality of conversion paths within a marketing channel, wherein the content item is associated with one or more marketing activities;
determining a first attribution credit that is based on a number of the plurality of conversion paths within the marketing channel and on a number of user interactions with the content item at a particular position in the plurality of conversion paths within the marketing channel;
determining a second attribution credit that is based on the number of the plurality of conversion paths within the marketing channel and on a number of user interactions with the content item at a different particular position in the plurality of conversion paths within the marketing channel;
based on the first attribution credit and the second attribution credit, determining an attribution contrast ratio that quantifies an effect of the content item at the particular position in the plurality of conversion paths within the marketing channel to an effect of the content item at the different particular position in the plurality of conversion paths within the marketing channel;
identifying an opportunity based on the determined attribution contrast ratio, wherein identifying the opportunity comprises identifying marketing activities that are undervalued, and wherein an undervalued marketing activity has an attribution contrast ratio greater than a predefined number; and
responsive to determining that a marketing activity, in the one or more marketing activities, associated with the content item is undervalued:
presenting a recommendation for the marketing activity based on the identified opportunity, wherein the recommendation includes a bid value for the marketing activity within the marketing channel.

13. The system of claim 12, wherein the operations determine the attribution contrast ratio by dividing the second attribution credit by the first attribution credit.

14. The system of claim 12, wherein the particular position in the plurality of conversion paths is an initial position in the plurality of conversion paths and the different particular position in the plurality of conversion paths is a last position in the plurality of conversion paths.

15. The system of claim 12, wherein the first attribution credit is an attribution model currently used by a content item provider and the second attribution credit is an alternative attribution model.

16. The system of claim 12, wherein the marketing activity corresponds to one or more keywords.

17. The system of claim 12, wherein the opportunity is an opportunity to adjust spending for the marketing activity.

18. The system of claim 17, wherein adjusting spending for the marketing activity comprises placing or modifying bids on keywords.

19. A non-transitory computer-readable medium having instructions stored thereon, the instructions operable to cause one or more computing devices to perform operations comprising:
receiving information corresponding to a plurality of conversion paths that each end with a respective conversion and each include a set of user interactions that occurred prior to the respective conversion by a respective user, the information including data relating to user interactions with a content item in the plurality of conversion paths within a marketing channel, wherein the content item is associated with one or more marketing activities;
determining a first attribution credit that is based on a number of the plurality of conversion paths within the marketing channel and on a number of user interactions with the content item at a particular position in the plurality of conversion paths within the marketing channel;
determining a second attribution credit that is based on the number of the plurality of conversion paths within the marketing channel and on a number of user interactions with the content item at a different particular position in the plurality of conversion paths within the marketing channel;
based on the first attribution credit and the second attribution credit, determining an attribution contrast ratio that quantifies an effect of the content item at the particular position in the plurality of conversion paths within the marketing channel to an effect of the content item at the different particular position in the plurality of conversion paths within the marketing channel;
identifying an opportunity based on the determined attribution contrast ratio, wherein identifying the opportunity comprises identifying marketing activities that are undervalued, and wherein an undervalued marketing activity has an attribution contrast ratio greater than a predefined number; and responsive to determining that a marketing activity, in the one or more marketing activities, associated with the content item is undervalued:

presenting a recommendation for the marketing activity based on the identified opportunity, wherein the recommendation includes a bid value for the marketing activity within the marketing channel.

20. The computer-readable medium of claim 19, wherein the operations determine the attribution contrast ratio by dividing the second attribution credit by the first attribution credit.

21. The computer-readable medium of claim 19, wherein the particular position in the plurality of conversion paths is an initial position in the plurality of conversion paths and the different particular position in the plurality of conversion paths is a last position in the plurality of conversion paths.

22. The computer-readable medium of claim 19, wherein the first attribution credit is an attribution model currently used by a content item provider and the second attribution credit is an alternative attribution model.

* * * * *